United States Patent [19]
Maas et al.

[11] Patent Number: 5,199,100
[45] Date of Patent: Mar. 30, 1993

[54] WET END TERMINATION FOR TOWED CABLE

[75] Inventors: Steven J. Maas, Simi Valley; A. Douglas Meyer, West Hills; John F. Cappi, Canoga Park, all of Calif.

[73] Assignee: Litton Systems, Inc., Beverly Hills, Calif.

[21] Appl. No.: 838,893

[22] Filed: Feb. 21, 1992

[51] Int. Cl.⁵ ............................ G02B 6/00; G02B 6/36
[52] U.S. Cl. .................................................... 385/139
[58] Field of Search ............................... 385/138, 139

[56] References Cited
U.S. PATENT DOCUMENTS

| | | | |
|---|---|---|---|
| 4,444,461 | 4/1984 | Wey et al. | 385/139 X |
| 4,657,340 | 4/1987 | Tanaka et al. | 385/139 X |
| 4,717,233 | 1/1988 | Szkaradnik | 385/139 X |
| 4,746,189 | 5/1988 | Arrington et al. | 385/139 |
| 5,083,875 | 1/1992 | Cedrone | 385/139 |
| 5,119,455 | 6/1992 | Jennings et al. | 385/139 X |

Primary Examiner—Akm E. Ullah
Attorney, Agent, or Firm—Elliott N. Kramsky

[57] ABSTRACT

A wet end termination for a towed cable. An elongated cylindrical structure includes a bellows surface that is extendable under towing force. The cylindrical structure includes opposed tapered ends, the rear ends encapsulated the region of splice between the optical fiber conductor of the cable and the optical circuit of the towed array.

11 Claims, 1 Drawing Sheet

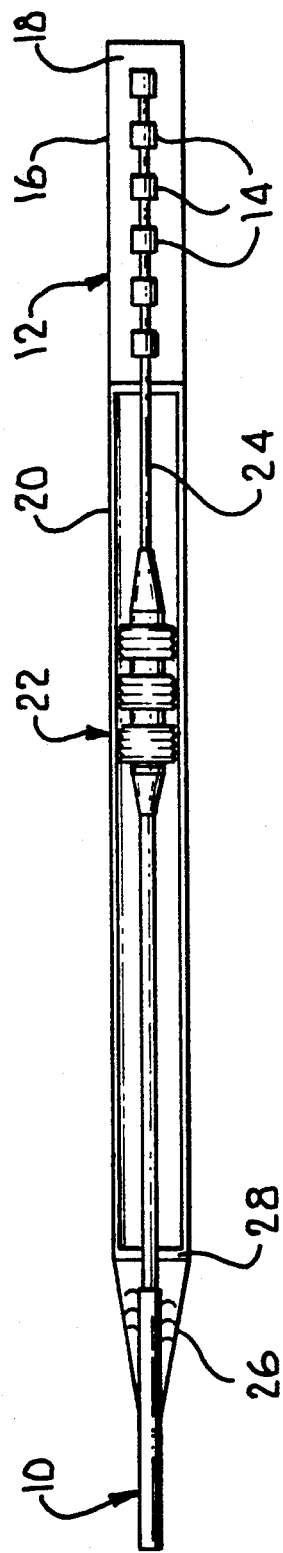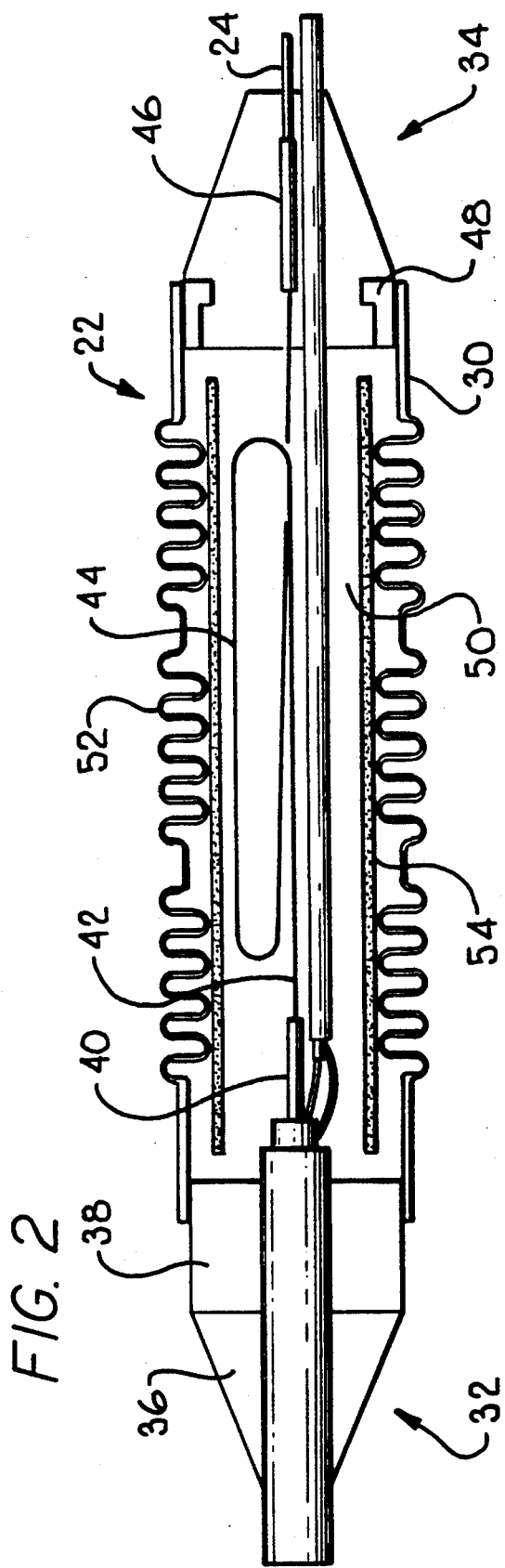

WET END TERMINATION FOR TOWED CABLE

BACKGROUND

1. Field of the Invention

The present invention relates to cables of the type employed for communication of optical and/or electrical signals between a ship and sensors of the hydrophone type. More particularly this invention pertains to an improved wet end termination for such a cable.

2. Description of the Prior Art

SONAR-based systems for detecting underwater hazards and threats employ pressure-actuated transducers of the hydrophone type to generate signals indicative of the presence and location of underwater objects. Such objects are "illuminated" by the reflection of acoustic wavefronts that are initially transmitted from a ship. The acoustic signals, when reflected, provide phase shift information that, when processed, enables one to ascertain underwater position.

In use, a SONAR system utilizes a predetermined submergeable arrangement of acoustic hydrophones to collect a spatial distribution of "echo" data that can be analyzed for such information as position and closing rate.

The array is housed within a hose-like element that is fixed to the end of a towing cable comprising an arrangement of optical fibers and/or electrical conductors within a protective outer jacket. An example of such a cable is disclosed in U.S. Pat. No. 4,952,012 of Stamnitz entitled "Electro-Opto-Mechanical Cable For Fiber Optic Transmission Systems."

The processing of data from an array is well-known and discussed, for example by A. Dandridge et al. in the article "Multiplexing of Interferometric Sensors Using Phase Carrier Techniques," *Journal of Lightwave Technology*, Vol. LT-5, No. 7 (July 1987) at pages 947-952.

While the towed array is a well accepted and recognized element of a SONAR system, its realization in practice is fraught with a number of serious mechanical difficulties. Some of such problems are related to deployment of the array while others pertain to the maintenance of reliable optical and/or electrical contact between it and the SONAR equipped ship.

The cable for a towed array may have a outer diameter of approximately one half inch, enclosing a plurality of optical fibers and/or a coaxial electrical optical conductor. The cable arrangement described in the Stamnitz patent comprises a 0.6 inch steel "armoring" cable that includes two layers of armoring wrapped around a central member containing the fiber optics. Eighteen (18) 250 micron buffered fibers are enclosed within a tube or jacket. The eighteen optical fibers provide optical communication between the hydrophones of the array and the on-board electronics. An example of an alternative cable arrangement for a towed array might include a 0.6 inch steel armored cable including two layers of armoring wrapped around a central member containing the fiber optics and a coaxial wire. In one such arrangement, seven steel tubes contain eighteen (18) 250 micron buffered fibers with one large tube enclosing twelve fibers, six small tubes enclosing one fiber each and a coaxial line. The single-fiber tubes are helixed around the large tube. Other arrangements may, of course, be utilized for communication between the towed array and the ship electronics.

The armoring and jacketing of the optical fibers is employed to protect the relatively-fragile fibers and/or electrical conductor. Such conductors and fibers require protection in view of the substantial stresses that can be incurred during both deployment and use of the array. A typical array may weigh in the neighborhood of 200 pounds and require a cable weighing 2,000 pounds or more. A ship towing the array at twenty-five (25) knots can cause such an arrangement to be subjected to significant stresses that will be felt most acutely at the distal underwater or "wet" end of the cable in the region of joinder to the towed array.

The stressing of the cable and array demands special care at the wet-end termination where the cable's conductors are joined to those of the towed array. As mentioned earlier, the hydrophones of the towed array are enclosed within a flexible hose. A fill fluid such as ISOPAR L, a trademark of the Exxon Corporation, selected for its acoustic properties to assure that the reflected waves are transmitted to the hydrophones within the hose-like structure, fills the interior of the hose. Typically, the conductors of the multiplexed hydrophone network are sturdier than those of the cable, such conductors being formed, for example, of 900 micron thick HYTREL (a trademark of the DuPont Corporation) coated fiber.

In the prior art, the cable is typically terminated with a coupling module that encloses optical fusion splices between the cable conductor and the 900 micron HYTREL coated fiber of the towed array. The splices are encapsulated with an appropriate compound for protection from the fill fluid, which is quite caustic. Additional optical fiber is provided in the form of a loop to take up some stressing of the cable's outer jacket. The interior of the coupling module is filled with open cell foam, providing a snug fit.

Prior art arrangements such as described above do not always provide sufficient protection from the often-hostile environment. By constraining the fiber inside the packed foam, the freedom of the fiber of the loop to extend axially within the cable and thereby absorb some stressing is hindered. This effectively defeats the margin of safety provided by the loop. Furthermore, the coupling module, typically formed of rubber or other hose-like material, does not provide adequate structural support when the termination is reeled or placed under other stresses. On board, the cable is stored on a winch, requiring flexibility. The cable must hold up to rough handling during and after deployment. The hose-like coupling modules of the prior art leave the wet end subject to damage when grasped near the interconnection of the conductors of the cable to those of the array since jacketing must be stripped from the cable to allow splicing to the towed array. As a result, this portion of the cable is relatively vulnerable to damage due to squeezing and the like.

SUMMARY OF THE INVENTION

The present invention addresses and overcomes the foregoing and other disadvantages of the prior art by providing apparatus for joining one end of a cable of the type that includes an elongated cylindrical outer jacket that surrounds a first conductor to at least one sensor of the type that includes a second conductor. Such apparatus includes a splice for joining the conductors. The first conductor includes a loop whereby its length exceeds the unstressed length of the outer jacket. First means, fixed to the outer jacket of the cable, are provided. Second means are provided in spaced relationship to the first means. Such second means encloses the splice. A wall, the opposed sides of which are fixed to the first means and the second means, defines a chamber. The loop is located within the chamber.

The foregoing and other features and advantages of this invention will become further apparent from the detailed description that follows. Such detailed description is accompanied by a set of drawing figures. Numerals of the drawing figures, corresponding to those of the written description, point to the features of the invention, like numerals referring to like features throughout both the written description and the drawing figures.

BRIEF DESCRIPTION OF THE DRAWINGS

FIG. 1 is a cross sectional view of a wet end towed cable termination including apparatus in accordance with the invention; and FIG. 2 is a detailed cross sectional view of apparatus in accordance with the invention for use in the wet end termination of FIG. 1.

DETAILED DESCRIPTION

FIG. 1 is a cross sectional side elevation view of a wet end termination for a towed cable 10. The termination provides both mechanical connection and conductive contact between the cable 10 and a towed array 12. Hydrophones 14 of the array 12 are enclosed in a hose-like structure 16 that, as described earlier, is flooded with an appropriate fill fluid 18 that also fills a flexible coupling module 20 that houses the termination apparatus 22 of the invention.

The hydrophones 14 of the array 12 are optically (and/or electrically) interconnected by a network of optical fibers and/or electrical conductors. A single conductor 24 is representative of the emergent or output segments of the fibers or other conductors that comprise that network.

The conductors 24 of the towed array 12 are joined to those of the cable 10 at the termination 22 that comprises the invention. As can be seen, an outer armoring jacket of the cable 10 is stripped where the cable enters the coupling module 20 through a front end nose cone 26. The nose cone 26, a tapered solid piece formed, for example, of stainless steel or titanium filled with EPOXY resin, is provided for minimizing stresses that result from trolling the coupling module 20 through a body of water. This occurs almost continually during deployment or use. Representative tow speeds of, for example, 20 knots or higher can impose significant structural stresses at the end of the cable. The nose cone 26 is bolted to a front end bulkhead 28 of the coupling module 20 and, as mentioned earlier, the interior of the coupling module 20 is flooded with fill fluid.

The coupling and towed array modules 20 and 16 respectively are representative of existing apparatus. The essence of this invention resides, however, in the structure and features of the termination apparatus 22 that is discussed in detail below. As mentioned earlier, prior art conductive connections between cable 10 and the towed array 12 are made by fusion splicing of the optical fibers of the cable 10 to corresponding ones of the array 12. Each of such splices is protected from the caustic fill fluid by conventional telecom splice protection such as an arrangement of heat shrink tubing and a steel rod. Additional cable fiber is provided to take up cable extension in the form of fiber loops. The interior of the coupling module 20 is filled with an open cell foam, providing a snug fit to complete the prior art wet end temination.

FIG. 2 is a cross sectional view of the cable termination 22 of the invention. This apparatus provides numerous advantages over the just-described conventional wet end termination of the prior art. The termination 22 consists of a generally-cylindrical structure that, as shown in FIG. 1, fits slidably within the "standard" coupling module 20. As will be shown, the termination 22 provides additional protection for the splices that join the input/ouput fibers of the towed array 12 to those of the cable 10. Furthermore, the termination 22 removes all hindrance to deployment of the fiber loop, allowing it to take up cable extension due to towing forces. This helpful feature, superficially present in the prior art, is jeopardized and, in fact, essentially negated in effectiveness by its tight wrapping with open cell foam. Such tight wrapping effectively immobilizes the fiber, preventing the unwinding of the loop required for fiber extension.

Refering to FIG. 2, the termination 22 includes a generally-cylindrical steel barrel 30 whose opposed ends are bolted to a tapered front piece 32 and a tapered end piece 34, forming a closed chamber therebetween. The front piece 32 consists of a tapered strain relief 36 molded to a cable clamp 38. The tapered strain relief 36 acts to relieve stressing at the termination junction when this portion of the cable is wound upon a winch for deck storage. Similarly, the taper of the end piece 34 serves the same function, thereby preventing kinking of the cable as it is wound, unwound or stored in use. Such tapered strain relief pieces also assist during deployment and retrieval.

As seen in FIG. 1, the outer jacket of the cable 10 is stripped prior to insertion into the front piece 32 that may be formed, for example, of aluminum. This exposes the hard plastic jacket 56 beneath the steel outer armoring 58. As shown, after insertion into the chamber within the cylindrical barrel 30, the cable 10 is further stripped of the plastic jacket to expose steel tube(s) 40, each encasing one or more fragile optical fibers 42. A steel tube 40 permits slidable axial movement between the fiber 42 and the rest of the cable structure 10, insulating the fiber 42 somewhat from stressing. As mentioned earlier, an additional length of cable fiber is provided in the form of a loop 44. Such looped fiber length is taken up upon extension of a metal bellows, dicussed below.

A conventional splice protector 46 jackets the region of splicing of the cable fiber 42 to the array conductor 24. Each of such splices is positioned within the solid rear piece 34 that is preferably formed of molded urethane. A connecting ring 48, bolted to the cylindrical barrel 30, encircles the neck of the end piece 34. By encasing the splice(s) within the solid block 34, additional splice isolation and, thus, protection is provided from the caustic fill fluid 50 within the chamber defined by the barrel 30, the front and the rear pieces 32 and 34, respectively.

A metal bellows 52 is located intermediate the length of the body. This structure offers flexibility, both radially and axially, while providing a hard, protective exterior. The radial flexibility of the barrel 34 permits the device to function properly when stored on a winch, when deployed and when retrieved. Furthermore, in addition to providing radial flexibility, the bellows 52 is readily extended when the array 12 encounters a predetermined amount of axial stress. This, in turn, reduces the stressing of the cable 10 as loading is relieved until such time as the bellows 52 is fully extended.

While the bellows 52 provides flexibility in an axial direction, it remains a steel structure of some rigidity and is therefore protective of the interior of the chamber containing the fiber loop 44. A thin foam lining 54 surrounds the loop 42, protecting it from pinching by the bellows structure 52. Unlike the open cell foam packing of the prior art, the foam lining 54 of the invention is a relatively thin layer that permits clearance within the chamber and allows the loop 44 to unwind without significant obstruction upon the extension of the bellows 52.

Thus it can be seen that, by employing a termination apparatus 22 in accordance with the invention in combination with an otherwise-conventional coupling module and splice arrangement, one can enhance the integrity of both mechanical coupling and communicative connection between a cable and a towed array. By positioning the cable fiber extension loop loosely within a cylindrical chamber of stainless steel or the like, the fiber is protected from damage from handling. By providing a molded end piece and by effectively encapsulating the array-to-cable splice(s) therein, damage due to relatively caustic fill fluid is minimized. The presence of a bellows structure lessens the transfer of tensile force to the cable 10, enhancing its useful life.

While the invention has been described with reference to its presently-preferred embodiment, it is not so limited. Rather, this invention is limited only insofar as defined by the following set of patent claims and includes within its scope all equivalents thereof.

What is claimed is:

1. Apparatus for joining one end of a cable of the type that includes an elongated outer jacket that surrounds a first conductor to at least one sensor of the type that includes a second conductor, said apparatus comprising, in combustion:
   a) a splice for joining said conductors;
   b) said first conductor comprising a segment whereby the length of said first conductor exceeds the unstressed length of said outer jacket;
   c) a front piece fixed to the outer jacket of said cable;
   d) a rear end piece in spaced relationship to said front piece, said rear end piece enclosing said splice;
   f) opposed ends of a wall being fixed to said front piece and said rear end piece to define a chamber; and
   e) said segment being located within said chamber.

2. Apparatus as defined in claim 1 wherein said wall includes a bellows intermediate said opposed ends.

3. Apparatus as defined in claim 2 further characterized in that:
   a) said front end piece is tapered;
   b) said rear end piece is tapered; and
   c) said front and rear end pieces are arranged so that said apparatus comprises a tapered front end and a tapered rear end.

4. Apparatus as defined in claim 3 wherein said chamber includes an acoustic fill fluid.

5. Apparatus as defined in claim 4 wherein said rear piece is of molded urethane arranged so that said splice is encapsulated therein.

6. Apparatus as defined in claim 5 wherein said front piece is of solid fabrication.

7. Apparatus as defined in claim 6 wherein said front piece further includes:
   a) an exterior metallic surface; and
   b) a solid resinous interior.

8. Apparatus as defined in claim 7 wherein said resinous interior is of EPOXY.

9. Apparatus as defined in claim 5 wherein said chamber further includes:
   a) a cylindrical foam lining; and
   b) said lining is arranged intermediate said segment and said bellows.

10. Apparatus as defined in claim 9 wherein said foam lining is so dimensioned to permit clearance therein whereby said segment is free to unravel as a consequence of the imposition of an axial force upon said cable.

11. Apparatus as defined in claim 10 wherein said wall is fabricated of steel.

* * * * *

UNITED STATES PATENT AND TRADEMARK OFFICE
CERTIFICATE OF CORRECTION

PATENT NO. : 5,199,100

DATED : March 30, 1993

INVENTOR(S) : Steven J. Maas, A. Douglas Meyer and John F. Cappi

It is certified that error appears in the above-identified patent and that said Letters Patent is hereby corrected as shown below:

Column 1, line 3, insert --The U.S. Government has a paid-up license of this invention and the right in limited circumstances to require the patent owner to license others on reasonable terms as provided for by the terms of contract No. N00014/89C2064 awarded by the Department of the Navy.--

Signed and Sealed this

Fourth Day of January, 1994

Attest:

BRUCE LEHMAN

Attesting Officer

Commissioner of Patents and Trademarks